H. W. RINTELMAN.
MILKING MACHINE.
APPLICATION FILED APR. 21, 1920.
1,380,499.
Patented June 7, 1921.
4 SHEETS—SHEET 3.
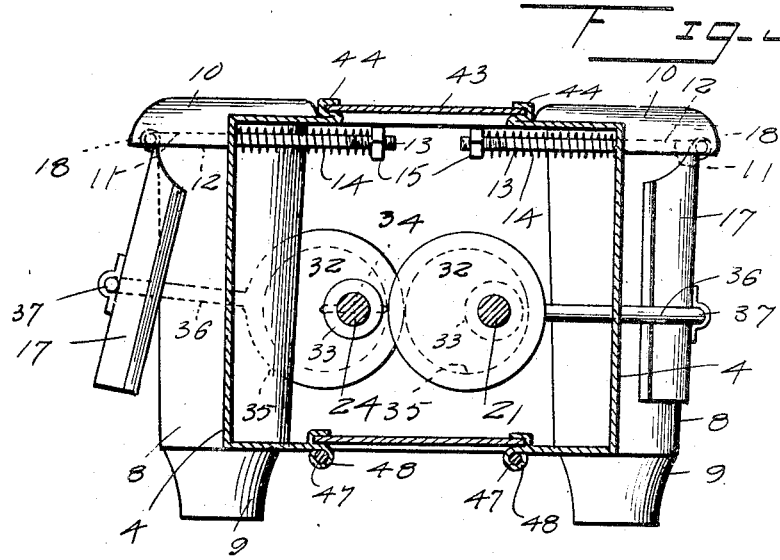
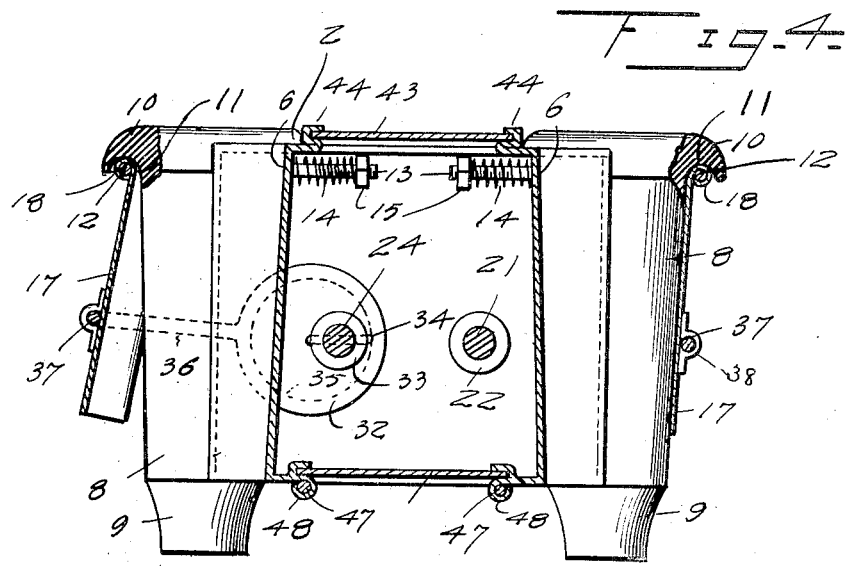
Inventor
H. W. Rintelman H. W. RINTELMAN.
MILKING MACHINE.
APPLICATION FILED APR. 21, 1920.
1,380,499.
Patented June 7, 1921.
4 SHEETS—SHEET 4.
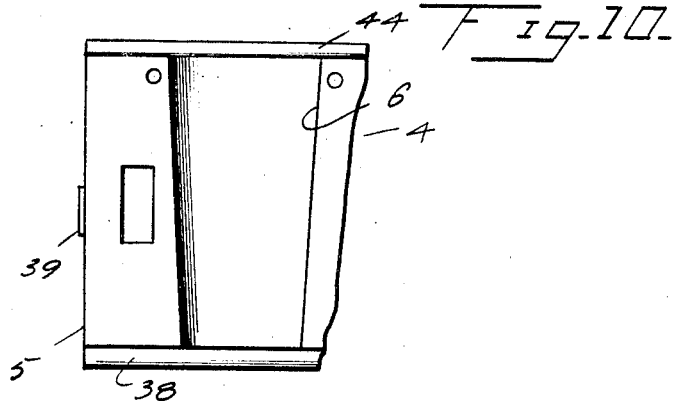
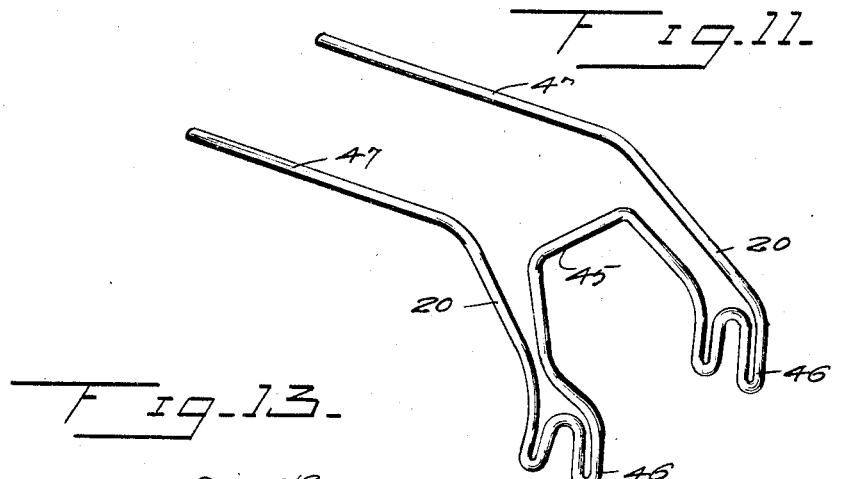
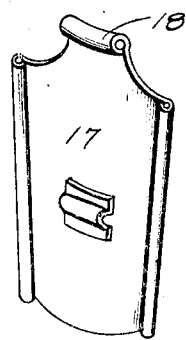
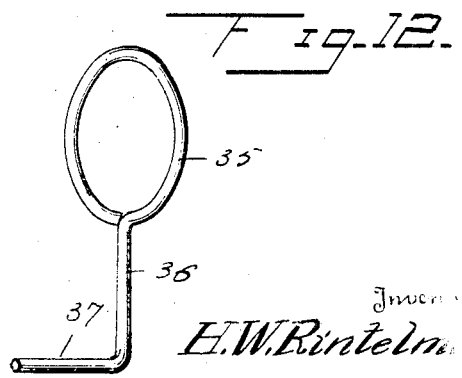

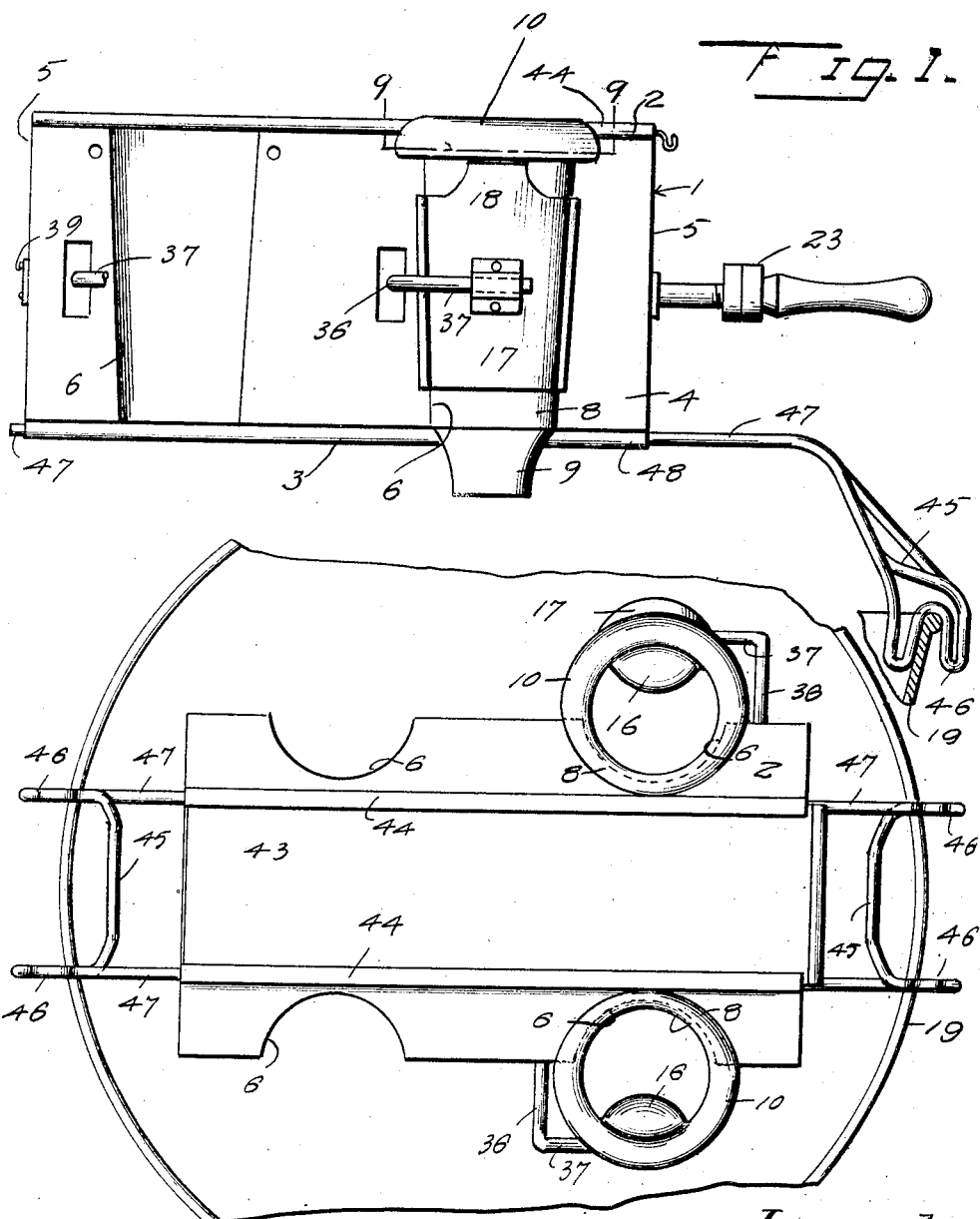

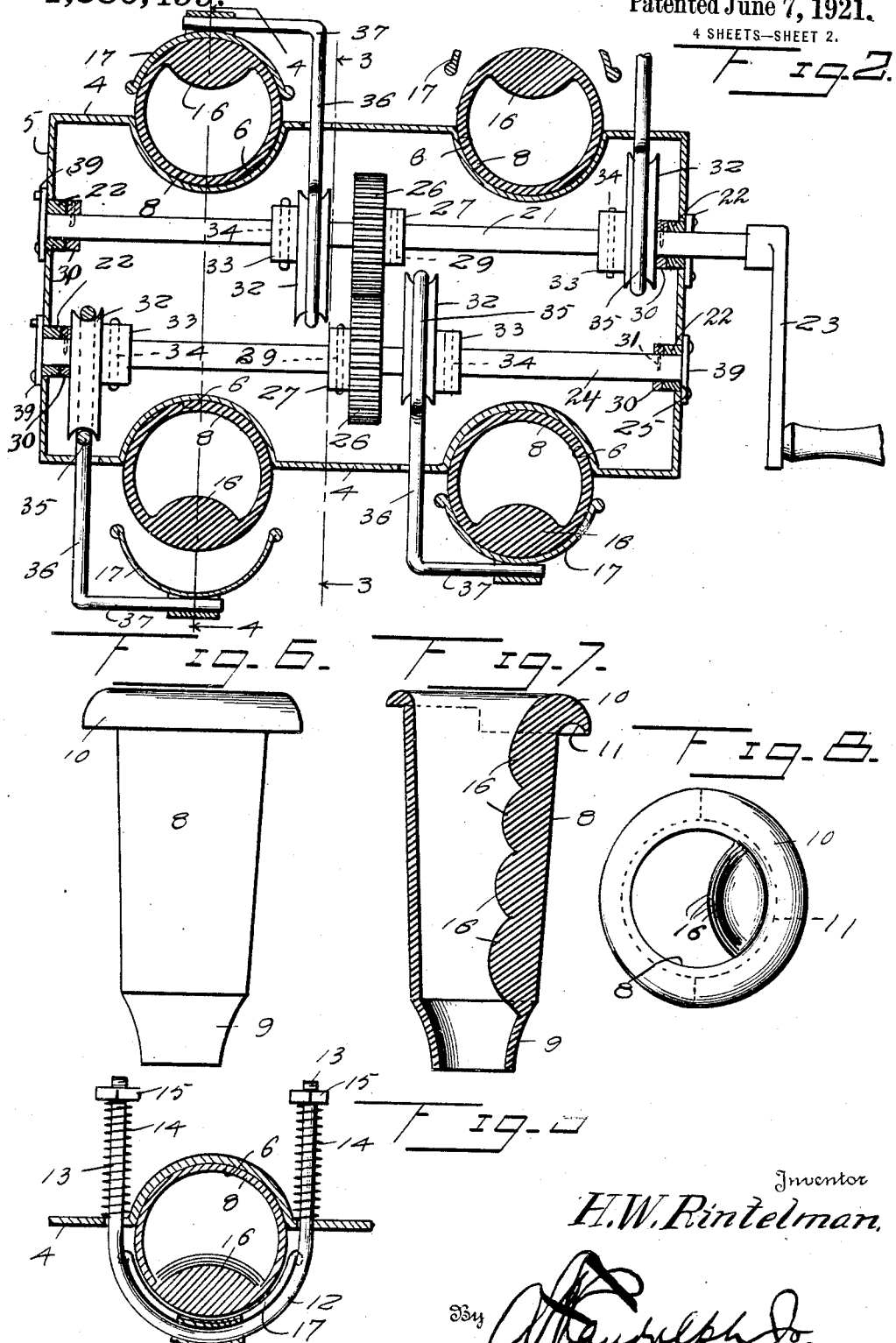

UNITED STATES PATENT OFFICE.

HENRY W. RINTELMAN, OF COTTONWOOD, SOUTH DAKOTA.

MILKING-MACHINE.

1,380,499. Specification of Letters Patent. Patented June 7, 1921.

Application filed April 21, 1920. Serial No. 375,627.

*To all whom it may concern:*

Be it known that I, HENRY W. RINTELMAN, a citizen of the United States, residing at Cottonwood, in the county of Jackson and State of South Dakota, have invented certain new and useful Improvements in Milking-Machines; and I do hereby declare the following to be a full, clear, and exact description of the invention, such as will enable others skilled in the art to which it appertains to make and use the same.

This invention relates to new and useful improvements in milking machines, and has for its primary object the provision of a device of the above stated character, which may be manually operated thereby obviating the use of artificial power for operating, thus reducing the cost of operation and the initial expense of installation.

Another object of this invention is the provision of a device of the stated character which may be easily and quickly transferred from one cow to another and which is of such a construction and size that the same may be attached and supported by a milk pail; thus a person supporting the pail in the usual manner under a cow also supports the machine leaving the hands free to operate said machine.

A further object of this invention is the provision of nipples to receive the teats of the cow which are adapted to be contracted or squeezed to extract the milk from the cow.

A still further object of this invention is the provision of means for squeezing or contracting the nipples from the bag engaging ends in the direction of their free ends to cause the teats to receive the usual milking pressure thereon.

A further object of this invention is the provision of an actuating means for the nipples operated by a single crank handle and is adapted to alternately squeeze the nipples of each pair thereby rendering the same effect on the cow as when milked manually without the disadvantage or annoyance of tired or cramped hands.

A still further object of this invention is the provision of a milking machine of the above stated character which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention reference is to be had to the following description and accompanying drawings, in which:

Figure 1 is a side elevation, illustrating a milking machine constructed in accordance with my invention and showing the same supported by a milk pail, Fig. 2 is a longitudinal sectional view illustrating the same, Fig. 3 is a transverse sectional view taken on the line 3—3 of Fig. 1.

Fig. 4 is a similar view taken on line 4—4 of Fig. 2,

Fig. 5 is a top plan view, illustrating the device with a pair of the teat nipples removed Fig. 6 is a side elevation, illustrating one of the nipples, Fig. 7 is a vertical sectional view illustrating the same, Fig. 8 is a top plan view illustrating the same, Fig. 9 is a detailed sectional view taken on line 9—9 of Fig. 1, illustrating the means of supporting the nipple and squeezing plate, Fig. 10 is a fragmentary view of the casing having the nipple removed, Fig. 11 is a perspective view illustrating one of the supports, Fig. 12 is a similar view of one of the cam shafts, Fig. 13 is a similar view illustrating one of the squeezing plates, Fig. 14 is a plan view illustrating one of the shields.

Referring in detail to the drawings, the numeral 1 indicates a casing including top, bottom, side and end walls 2, 3, 4, and 5 respectively. The side walls 4 are each provided with a pair of relatively spaced and vertically disposed indentations or recesses 6 which are substantially semi-circular in cross section. The recesses 6 are formed by bending the side walls inwardly and have located therein nipples 7 that project slightly beyond the ends of said recesses 6 and receive the teats of a cow. Each of the nipples 7 include a tapered tubular body 8 terminating at its lower end in a reduced neck or nozzle 9 and has formed on its upper end a semi-circular flange 10. Approximately one-half of the body 8 is confined within the recesses 6 of the casing 1 and the ends of the flange 10 terminate in engagement with the side wall 4. The under face of the flange 10 is concaved, as illustrated at 11, to engage a substantially U-shaped support 12. Each of the nipples 7 is provided with a support 12 that has its leg portions 13 screw-threaded and passed through openings in the side walls 4 adjacent the top wall 2 and have mounted thereon coiled springs 14 which bear against the inner faces of the side walls, and nuts 15 turned on the ends of said leg portions 13, providing a construction which will permit adjustment of the nipple to a cow's teat and also obviate any danger of placing too much pressure on the teat. Each of the bodies 8 of the nipples 7 have formed therein vertically disposed raised portions 16 adapted to form cushions for the teat, and the nipples are constructed from rubber or any other material suitable for the purpose which is capable of being squeezed or contracted. The cushions or raised portions 16 are adapted to resemble the fleshy or pad portions of a person's fingers and to act as the same on the cow's teat.

Squeezing plates 17 are secured to the supports 12 and engage the exposed portions of the nipples and are curved throughout their length to conform to the contour of said nipples, and have formed upon their upper ends curved ears or flanges 18 that hook over the bight portions of the supports 12 and under the flanges 10 which flanges prevent the ears 18 from becoming accidentally detached from the supports but permit the plates 17 to hinge thereon. The plates 17 extend the full length of the bodies 8 of the nipples 7, so that the nozzles 9 thereof depend below the casing 1 and said plates 17 so that the milk extracted from the cow by squeezing of the teats by the nipples and squeezing plate, will drain downwardly and be caught by an ordinary pail 19 disposed under the casing 1, and which is adapted to support the casing 1 through the medium of hangers 20.

An operating shaft 21 is journaled in suitable bearings 22 carried by the end walls of the casing 1, and one end of said shaft projects beyond one of the end walls and has detachably secured thereto a crank handle 23. A shaft 24 is journaled in bearings 25 in the casing 1, and extends parallel with the shaft 21 and is connected thereto by means of the gears 26. Each of the gears 26 have an extended hub 27 provided with an opening to receive a pin 29. The pins 29 of the hubs 27 are adapted to extend through the shafts 21 and 24 for securing the gears to their respective shafts whereby upon rotation of the crank handle 23 the shafts will be rotated in opposite directions. The shafts 21 and 24 are prevented from having endwise movement by collars 30 which are secured to said shafts by pins 31 extending therethrough and through the respective shafts.

Pairs of spaced cams 32 are secured to the shafts 21 and 24, and have extended hubs 33 provided with openings to receive pins 34 that extend through the respective shafts for causing the cams to rotate with said shafts. The cams have concaved or grooved peripheries and are engaged by eccentric straps 35 of cam shafts 36 which are slidably mounted in the side walls 4 of the casing 1 and also extend through said side walls and have their ends bent at right-angles to form attaching arms 37. The attaching arms 37 are hinged to the squeezing plates 17, as illustrated at 38, so that upon rotation of the shafts the cams will move the squeezing plates toward and away from the nipples 7. The cams 32 are so arranged that one nipple of each pair will be squeezed while the other nipple will be allowed to expand or return to its initial position thus causing alternating milking of the teats of the cow. It is also to be noted that the squeezing of the nipples by the squeezing plates will be in a gradual downward direction from their upper ends owing to the fact that the upper ends of the squeezing plates are hinged in close proximity to the nipples and never move far from said nipples, and as the squeezing plates start to squeeze the nipples, the upper ends thereof are the first to exert pressure on the nipples squeezing the upper portions of the teats and cutting off the flow of milk from the cow's bag to the teats and then gradually squeeze the milk contained within the teats outwardly thereof, and as the squeezing plates release the nipples, the milk again flows into the teats ready for the next squeeze or milking pressure on the teats.

If desired the cam shafts 36 may be constructed of a heavy gage wire and the strap portions 35 may be formed integral with said shafts by bending the wire. Shields 39 are pivoted to the end walls of the casing 1 and are adapted to overlie the ends of the shafts 21 and 24 or their respective bearings and are provided with hooks 40 adapted to engage keepers 41 to prevent said hooks from accidental movement, but will permit them to be swung on their pivots when desiring to oil or lubricate the bearings.

The top and bottom walls 2 and 3 of the casing, are provided with slots to form hand openings and which are closed by removable slides or covers 43. Guide-ways 44 are formed along the edges of the slots to slidably receive the covers 43. By removing either of the covers access to the interior of the casing may readily be had and which is desirable in some instances for adjusting the supports 12 so as to permit the nipples to be applied to teats of different sizes.

Each of the supports 20 are constructed from a single length of wire which is first bent upon itself to form a handle 45 that has its ends bent into gripping portions 46 adapted to fit over the edge of the pail 19 and then are bent upwardly and inwardly in a plane with the handle 45 and then horizontally to form parallel attaching arms 47. The attaching arms 47 are slidably received within brackets 48 secured to the bottom wall 3, and have frictional contact with said brackets providing a means whereby the support can be adjusted to various distances from the end of the casing 1, or in other words to provide supports for each end of the casing that can be adjusted to fit milk pails of different sizes and which will support the casing directly over the milk pail so that during the milking of the cow the milk draining from the nipples 9 will flow directly into the bucket.

From the foregoing description taken in connection with the accompanying drawings, it will be noted that a milking machine has been provided which is simple in construction and operation and which can be easily carried by a person from one place to another and also that the device may be readily applied and supported by a milk pail, so that when a person sits to assume the process of milking with the pail between the knees, the casing is disposed in such a position that the cow's teats can be readily inserted into the nipples, and on rotating the crank handle the teats will be squeezed to extract the milk from the cow and which milk will be directed into the pail by the nozzles of said nipples.

While I have shown and described the preferred embodiment of my invention, it will be understood that minor changes in construction, combination and arrangement of parts may be made without departing from the spirit and scope of the invention as claimed.

Having thus described my invention what I claim is:

1. A milking machine comprising a casing, means supporting and attaching the casing in spaced relation and over a pail, nipples detachably secured to said casing and adapted to receive a cow's teats, and means for squeezing said nipples.

2. A milking machine comprising a casing having recesses, nipples in said recesses, supports engaging said nipples and adjustably and yieldably connected to said casing, squeezing means hinged to said supports and engaging the nipples, and means for actuating the squeezing means.

3. A milking machine comprising a casing having recesses, elastic nipples partially confined in said recesses, supports engaging said nipples and adjustably and yieldably connected to the casing, squeezing elements hinged to said supports and engaging the nipples, and means for actuating the squeezing elements.

4. A milking machine comprising a casing having recesses, elastic nipples partially confined in said recesses, flanges formed on said nipples, supports underlying said flanges and adjustably and yieldably secured to the casing, squeezing means carried by said supports and engaging the nipples, and means for actuating the squeezing means.

5. A milking machine comprising a casing having recesses, elastic nipples partially confined in said recesses, semi-circular flanges formed on the upper ends of the nipples, substantially U-shaped supports engaging the nipples under the flanges and adjustably and yieldably secured to the casing, squeezing means carried by said supports, and means for actuating said squeezing means.

6. A milking machine comprising a casing having recesses, elastic nipples located in said recesses, flanges formed on the upper ends of said nipples, substantially U-shaped supports engaging the nipples under the flanges and having their legs screw-threaded and extended through the casing, springs mounted on said legs, nuts turned on the ends of said legs, squeezing means carried by said supports, and means for actuating the squeezing means.

7. A milking machine comprising a casing having recesses, elastic nipples partially confined in said recesses, supports securing the nipples to said casing, plates hinged to said supports and curved to conform to the contour of the nipples and extending lengthwise of the latter, and means connected to said plates for causing said plates to squeeze the nipples.

8. A milking machine comprising a casing, nipples carried by said casing, squeezing plates associated with the nipples, shafts journaled in said casing, means connecting the shafts together, cams secured to said shafts, cam shafts connecting the cams to the squeezing plates, and a crank for rotating one of the shafts.

9. A milking machine comprising a casing, nipples carried by said casing, means for squeezing said nipples, a pair of supports adjustably secured to said casing and each including a single length of wire bent upon itself to form a handle, the ends of said handle being bent to form clamps adapted to engage the edge of a pail, the ends of said clamps being extended upwardly and inwardly in a plane with the handle and then disposed horizontally to form attaching arms that are adjustably secured to the casing.

In testimony whereof I affix my signature in presence of two witnesses.

HENRY W. RINTELMAN.

Witnesses:
 SAM W. DAVIS,
 HARRY S. COCHRAN.